United States Patent [19]

Marzocchi et al.

[11] 4,246,314

[45] Jan. 20, 1981

[54] ASPHALT-COATED GLASS FIBERS

[75] Inventors: Alfred Marzocchi; Michael G. Roberts; Charles E. Bolen, all of Newark, Ohio

[73] Assignee: Owens-Corning Fiberglas Corporation, Toledo, Ohio

[21] Appl. No.: 48,220

[22] Filed: Jun. 13, 1979

[51] Int. Cl.³ .................. B32B 9/00; B32B 11/00; D02G 3/00
[52] U.S. Cl. .................. 428/378; 106/273 R; 428/389; 428/392; 428/393; 428/394; 428/457; 428/489
[58] Field of Search ............. 428/375, 378, 392, 394, 428/389, 395, 393, 489; 106/273 N, 273 R, 282

[56] References Cited

U.S. PATENT DOCUMENTS

| | | | |
|---|---|---|---|
| 2,375,117 | 5/1945 | Lentz | 106/273 R |
| 2,938,812 | 5/1960 | Marzocchi et al. | 428/389 |
| 3,002,857 | 10/1961 | Stalego | 428/378 |
| 3,730,759 | 5/1973 | Marzocchi | 260/429.5 |
| 3,796,627 | 3/1974 | Marzocchi | 428/392 X |

*Primary Examiner*—Lorraine T. Kendell
*Attorney, Agent, or Firm*—Ronald C. Hudgens; Charles F. Schroeder; Keith V. Rockey

[57] ABSTRACT

Glass fibers, either in the form of individual filaments or bundles of glass fibers, which have been coated with a chemically-modified asphalt prepared by reacting a bituminous material with an organo metallic compound in the form of an orthoester or an organo metallic boron compound. The coated fibers can be used as reinforcement for bitumen or bitumen plus aggregate to securely tie the glass fiber surfaces to the bitumen.

16 Claims, No Drawings

ASPHALT-COATED GLASS FIBERS

This invention relates to asphalt reinforced materials, and more particularly to glass fibers treated with chemically-modified asphalts to promote compatibility between glass fibers and asphalt in the manufacture of glass fiber-reinforced asphalt systems.

In recent years, increasing attention has been given to the use of reinforcement of asphalt systems as provided by glass fibers. One of the problems which has been incurred in integrating glass fibers with asphalt as a reinforcement stems from the fact that glass fibers or fragments of glass have smooth, hydrophilic surface characteristics. Thus, the smooth, hydrophilic surfaces of the glass fibers make it difficult to establish any bond, either chemical or physical, between the glass fibers and the asphalt system in which the glass fibers are distributed as reinforcement. In fact, as the highly hydrophilic characteristics of the glass fibers are formed, a thin film of moisture which serves to destroy any chemical or physical bond which might otherwise be formed between the glass fiber surfaces and the asphalt.

The problem of establishing a secure bonding relationship between the glass fiber surfaces and the asphalt is not aided by the chemical nature of the asphalt. Asphalt is a cementitious material containing predominantly bitumens occurring in nature or obtained as a result of the refining of petroleum. Chemically, the asphalt is made up of condensed hydrocarbon rings, and thus is highly hydrophobic in nature, thereby further causing incompatibility with the hydrophilic glass fiber surfaces.

It has been determined that the condensed hydrocarbon ring of asphalt does contain various reactive groups, notably carbon-to-carbon double bonds, carboxy groups and hydroxy groups. These groups, however, do not measurably affect the hydrophobic characteristics of asphalt systems. It has been proposed, in U.S. Pat. No. 4,036,661, to integrate asphalt with mineral aggregate by adding to the asphalt an organo silicon compound, and preferably one derived from an organo silane in which the organic group contains one or more functional groups such as an amino group, an aminoalkyleneamino group, a glycidoxy group, a hydrocarbyl group, an acyloxy group or a mercapto group. The difficulty in the approach described by the foregoing patent stems from the fact that organo silanes of the type taught therein are extremely expensive, and thus large quantities would necessarily be used in the construction of an asphalt road containing such silanes. Thus, the procedure proposed is economically unattractive.

It is accordingly an object of this invention to provide treated glass fibers for use in the reinforcement of asphalt systems to integrate the glass fibers with the asphalt in an efficient and economical manner.

It is a more specific object of the invention to provide glass fibers which have been treated with a chemically-modified asphalt so that chromium complexes are chemically reacted with the asphalt in such a manner as to establish a chemical bond between the chemically-modified asphalt and the glass fiber surfaces.

It is yet another object of this invention to provide a chemically modified asphalt composition having improved adhesion with respect to reinforcing fillers.

The concepts of this invention reside in an improved chemically modified asphalt composition produced by reactions of a bitumen (such as asphalt) with an organo metallic compound in the form of an orthoester or a borate ester. While the mechanism underlying the present invention is not fully understood at the present time, it has been found that the organo metallic compound becomes chemically integrated with the bitumen and is capable of reacting with surface groups of reinforcing fillers (such as glass fibers, aggregate, etc.) to promote a secure bonding relationship between the asphalt and such filler.

As the organo metallic compound, use can be made of titanium orthoesters having the general formula:

$$Ti(O-R)_4$$

wherein R is an organic group containing 2 to 20 carbon atoms. In the preferred form of this embodiment, R is $C_2$ to $C_{20}$ alkyl or $C_3$ to $C_{10}$ alkenyl. For example, the orthoester can be one derived from n-butyl alcohol (i.e., the n-butyl titanium orthoester), but is preferably derived from an alkenyl alcohol such as allyl alcohol (i.e., the allyl titanium orthoester). Other alcohols which can be used to prepare corresponding orthoesters include propyl alcohol, pentyl alcohol, hexyl alcohol, 2-buten-4-ol, 2-penten-5-ol, etc.

In accordance with another concept of this invention, the organo metallic compound is the reaction product of certain metal halides (e.g., chlorides and bromides) and a trialkyl borate or a trialkoxy boroxine. The preferred organo metallic compound of the present invention is the reaction product of titanium tetrachloride and trimethyl borate having the formula:

$$Cl_2Ti[OB(OCH_3)_2]_2.$$

This compound can be named bis(dimethoxy boryloxy) titanium chloride, and is prepared by reaction of titanium tetrachloride and trimethyl borate in a mole ratio of about 2:1. It is commercially available from the Chemical Division of Ventron Corporation under the trade name "Ventromer T-1".

However, a variety of other metal chlorides and bromides can be used in the preparation of the organo metallic compounds used in the invention, including the halides of gadolium, zirconium, hafnium, aluminum, antimony, tantalum, indium, iron, niobium, molybdenum and tungsten. These metal halides can be reacted with a trialkyl borate or a trialkoxy boroxine in which the alkyl groups or the alkoxy groups contain 1-5 carbon atoms, at room temperature as desired, although higher or lower temperatures can be used. It is generally found that temperatures within the range of 0° C. to the boiling point of the borate are suitable. If desired, the reaction can be carried out in the presence of an inert organic solvent.

The relative amount of the halide and borate reactants can be varied within wide ranges. It is generally sufficient that the reaction be carried out with a ratio of 0.1 to 1 moles of the alkyl borate or trialkoxy boroxine per mole of halogen contained in the metal halide. As will be appreciated by those skilled in the art, the reaction product may be, although not necessarily, a mixture. However, this is not disadvantageous since the resulting mixture can be used after removal of unconverted reactants. For example, use can be made of "Ventromer A-1" which is a commerical mixture of compounds produced by reaction of aluminum chloride and trimethyl borate.

The resulting chemically modified asphalt can thus be used as coating for glass fibers. It has been found that glass fibers treated in that manner can thereafter be employed as reinforcement for bitumens such as asphalt in a variety of applications, including road paving applications, roofing applications and the like. Thus, it is necessary to use only sufficient quantities of the organo metallic compounds to chemically modify the bitumens applied as a coating to the glass fibers. The bitumen coating on the glass fibers, in turn, can be securely integrated with bitumens or bitumens and aggregate whereby the chemically-modified bitumen coating on the glass fibers serve to securely intertie the glass fiber surfaces to the bitumen in which the glass fibers are distributed.

The concepts of this invention are not limited to use with glass fibers. In general, the concepts of this invention can be used in the treatment of natural or synthetic hydrophilic fillers and/or reinforcements in which the filler and/or reinforcement is present in the form of discrete particles. Included are fibers formed of such natural and synthetics such as polyvinyl alcohol, cellulose, as well as filler materials including glass flake.

The use of the concepts of the present invention with glass flake represents a particularly desirable embodiment of the invention. Thus, glass flake, discrete glass platelets can be admixed with the chemically-modified bitumens such as the chemically-modified asphalt in accordance with the concepts of this invention and then used in road paving and roofing applications. The glass flake tends to migrate within the asphalt to form a barrier layer of overlapping glass platelets, which in turn serves as a moisture-impervious membrane. This concept can be particularly advantageous when applied to road paving applications since the glass flake membrane serves to prevent moisture from permeating the asphalt road bed. The result is that there is less moisture under the surface of the asphalt to cause damage to the asphalt road bed through freezing.

The reaction between chemically-modified asphalt and the organo metallic compounds as described above is preferably carried out by dispersing the asphalt in an aromatic solvent inert under the reaction conditions (i.e., benzene, toluene, xylene, etc.) and then adding the complex. Best results are usually achieved when the reaction is carried out at a temperature ranging from 70 to 200° C. Proportions between the compounds and the asphalt are not citical and can be varied within relatively wide limits. In general, it is preferred that the amount of the organo metallic compond be an amount within the range of 0.001 to 5% by weight based upon the weight of the asphalt.

As indicated, the chemically-modified asphalt composition can be applied as a coating to the individual glass fiber filaments, preferably as they are formed in a conventional manner. The filaments may be coated as they are formed with the chemically-modified asphalt composition, preferably dissolved in a solvent, as they are gathered to form a strand. For that purpose, use can be made of an applicator constantly wet with the chemically-modified asphalt treating composition.

The coated glass fibers can be used directly as reinforcement for asphalt or asphalt plus aggregate in accordance with a known manner. The coated glass fibers are thus distributed as reinforcement in asphalt alone or asphalt blended with aggregate. The asphalt or asphalt plus aggregate thus serves as a continuous phase within which the glass fibers coated with the chemically-modified asphalt are distributed. The amount of the chemically-modified asphalt applied as a coating can vary within wide limits. Generally, the coating is applied to the individual glass fiber surfaces in an amount sufficient to constitute from 0.1 to 40% by weight of the glass fibers.

Alternatively, the glass fibers can be formed into yarns, strands, cords, woven and non-woven fabrics, etc., known in the art as bundles, and then subjected to impregnation. For this purpose, use can be made of untreated glass fibers or glass fibers which have been sized with any of a variety of well-known size compositions. As is well known to those skilled in the art, it is frequently the practice, in the processing of glass fibers in the form of bundles, to employ glass fibers which have been sized whereby the size composition imparts lubricity of the individual glass fiber filaments without destroying their fibrous characteristics. In that manner, the glass fibers can be processed in bundle form without risk of destruction of the glass fibers through mutual abrasion.

In accordance with this embodiment of the invention, a glass fiber bundle is impregnated with the chemically-modified asphalt composition whereby the impregnant serves to coat the individual glass fiber filaments and to completely fill the interstices between the glass fiber filaments forming the bundle and thereby define a unitary bundle structure. The resulting bundle can then be used in reinforcement of asphalt or asphalt plus aggregate as described above whereby the bundles of glass fibers which have been impregnated with the chemically-modified asphalt composition are distributed through the asphalt or asphalt plus aggregate as reinforcement in the continuous glass defined by the latter.

When the chemically-modified asphalt is applied as an impregnant in accordance with the invention, the amount of the chemically-modified asphalt applied as an impregnant can vary within relatively wide limits. Generally, the chemically-modified asphalt impregnant constitutes from 10 to about 60% by weight based on the weight of the glass fiber bundles. As will be appreciated by those skilled in the art, it is also possible to treat the glass fibers twice, first by applying a thin film coating containing the chemically-modified asphalt and then subject bundles of the thus coated fibers to impregnation whereby the chemically-modified asphalt serves as a size and as an impregnant.

When the concepts of this invention are applied to the use of glass flake, the asphalt, either in a molten or emulsified form, can be blended with the glass flake, and then the resulting composite applied to a, for example, road bed to form a wear layer. The platelets forming the glass flake tend to float in the fluid asphalt so as to form an overlapping, moisture-impervious layer just beneath the surface. It is that layer which thus forms a barrier against moisture.

The amount of the glass flake employed is not critical and can be varied within relatively wide limits. It is generally preferred that the amount of glass flake employed be such that it forms at least a single layer of glass flake particles overlapping the adjacent portion to form a moisture-impervious barrier. Best results are usually obtained when the glass flake ranges from 0.001 to 10% by weight based upon the weight of the glass flake with which the asphalt is combined.

Having described the basic concepts of the present invention, reference is now made to the following examples, which are provided by way of illustration and not by way of limitation, of the practice of this invention in the preparation of asphalt compositions chemically modified with organo silicon compounds and their use in the reinforcement of asphalt systems.

EXAMPLE 1

This examples illustrates the preparation of a modified asphalt composition useful in the practice of this invention.

A solution of 200 parts by weight of a paving grade asphalt (50/60 penetration at 77° F.) is dissolved in 50 parts by weight of toluene and placed in a stirred flask equipped with a heater. Thereafter, 1.2 parts by weight of n-propyl titanium orthoester [Ti(OCH$_2$CH$_2$CH$_3$)$_4$] are added to the solution.

The solution is then heated to 125° C. for 24 hours. At the end of that time, the heating is discontinued and the toluene solvent removed.

The chemically-modified asphalt is then applied as a thin film coating to glass fibers. The chemically-modified asphalt, dissolved in toluene, is applied to constitute a coating of about 0.85% by weight based on the weight of the glass fibers. It is then combined with asphalt and aggregate as reinforcement. The treated glass fibers are found to have good adhesion to the asphalt constituting the continuous phase in which the glass fibers are distributed as reinforcement.

EXAMPLE 2

Using the procedure described in Example 1, 2.0 parts by weight bis(dimethoxyl boryloxy) titanium chloride are reacted with 200 parts of asphalt in the presence of a solvent. The chemically-modified asphalt is thereafter applied as a thin film coating to individual glass fiber filaments.

It is found that good adhesion between the treated glass fibers and asphalt is achieved.

EXAMPLE 3

Using the procedure described in Example 1, the paving grade asphalt described in Example 1 is reacted with 1% by weight of allyl titanium orthoester [Ti(OCH$_2$CHCH$_2$)$_4$].

The resulting chemically-modified asphalt composition is then employed as a hot melt to impregnate bundles of glass fibers which have been sized with a glass fiber size composition of the type described in U.S. Pat. No. 3,837,989, the disclosure of which is incorporated herein by reference. The impregnant of the modified asphalt is applied in an amount to constitute about 17.5% by weight based on the weight of the glass fiber bundle.

The impregnated bundles are then combined with asphalt and aggregate whereby the impregnated bundles are distributed through the asphalt and aggregate as a continuous phase, the bundle serving as an impregnant therefor. Good adhesion between the impregnated bundles of glass fibers and the asphalt is achieved.

EXAMPLE 4

Using the procedure described in Example 1, blown asphalt is reacted with 0.9% by weight of Ventromer T-1 of Example 2. The resulting chemically-modified asphalt composition can be applied to glass fibers as a thin film coating described in Example 1 or as an impregant as described in Example 3. In either case, the resulting coated glass fibers are characterized by good adhesion to asphalt or asphalt plus a filler aggregate material.

The procedure employed in Example 4 illustrates another variation in the practice of this invention. The bitumen employed in that example is blown asphalt, asphalt which has been modified by reaction with air. As is now known to those skilled in the art, blown asphalt is partially oxidized to thereby increase the content of carboxyl groups in the bitumen itself. Conventional blown asphalt can be used in the practice of this invention, and is prepared by passing an oxygen-containing gas (preferably air) through the asphalt, while the asphalt is maintained at an elevated temperature within the range of 80° to 300° C., either with or without a solvent. It is generally preferred that the blown asphalt have an oxygen content ranging from 1–10% by weight based upon the weight of the asphalt.

It will be understood that various changes and modifications can be made in the details of procedure, formulation and use, without departing from the spirit of the invention, especially as defined in the following claims.

We claim:

1. Glass fibers having a coating thereon, said coating comprising the reaction product of (a) a bitumen and (b) an organo metallic compound selected from the group consisting of a metallic orthoester and a metallic borate ester.

2. Glass fibers as defined in claim 1 wherein said compound is a titanium orthoester.

3. Glass fibers as defined in claim 1 wherein said compound is a titanium orthoester having the formula:

$$Ti(OR)_4$$

wherein R is selected from the group consisting of an C$_3$ to C$_{10}$ alkenyl group and a C$_2$ to C$_{20}$ alkyl group.

4. Glass fibers as defined in claim 1 wherein the bitumen is asphalt.

5. Glass fibers as defined in claim 1 wherein the coating is in the form of a thin film coating on the individual glass fiber filaments.

6. Glass fibers as defined in claim 1 wherein the glass fibers are in the form of bundles and the coating is in the form of an impregnant in the bundle.

7. Glass fibers as defined in claim 6 wherein the impregnant substantially fills the interstices between the individual glass fiber filaments forming the bundle.

8. Glass fibers as defined in claim 6 wherein the individual glass fiber filaments forming the bundle contain a thin film size coating on the surfaces thereof.

9. Glass fibers as defined in claim 1 wherein the coating is present in an amount sufficient to constitute from 0.1 to 40% by weight based upon the weight of the glass fibers.

10. Glass fibers as defined in claim 1 wherein the glass fibers are in the form of bundles, with the coating constituting an impregnant in the bundle and being present in an amount from 10 to 60% by weight based upon the weight of the glass fiber bundles.

11. Natural or synthetic fibers having a coating thereon, said coating comprising the reaction product of (a) a bitumen and (b) an organo metallic compound selected from the group consisting of a metallic orthoester and a metallic borate ester.

12. Fibers as defined in claim 11 wherein the fibers are hydrophilic.

13. A glass fiber reinforced composite comprising a bitumen as a continuous phase and, as reinforcement in the bitumen, glass fibers as defined in claim 1.

14. A composite as defined in claim 13 wherein the coating is in the form of a thin film coating on the individual glass fiber filaments.

15. A composite as defined in claim 13 wherein the glass fibers are in the form of bundles and the coating is in the form of an impregnant in the bundle.

16. A composite as defined in claim 13 wherein the individual glass fiber filaments forming the bundle contain a thin film size coating on the surfaces thereof.

* * * * *